United States Patent
Roelfsema

(10) Patent No.: US 10,513,398 B2
(45) Date of Patent: Dec. 24, 2019

(54) ROLLER

(71) Applicant: Schott AG, Mainz (DE)

(72) Inventor: Klaas W. Roelfsema, Gasselternijveenschemond (NL)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/879,920

(22) Filed: Jan. 25, 2018

(65) Prior Publication Data

US 2018/0215550 A1 Aug. 2, 2018

(30) Foreign Application Priority Data

Jan. 27, 2017 (EP) .................... 17153453

(51) Int. Cl.
*B65G 39/02* (2006.01)
*B65G 13/07* (2006.01)
*B65G 43/08* (2006.01)
*B65G 47/26* (2006.01)
*B65G 39/07* (2006.01)

(52) U.S. Cl.
CPC ............. *B65G 39/02* (2013.01); *B65G 13/07* (2013.01); *B65G 39/07* (2013.01); *B65G 43/08* (2013.01); *B65G 47/261* (2013.01); *B65G 2203/042* (2013.01)

(58) Field of Classification Search
CPC .................................................. B65G 47/261
USPC ................. 198/780, 781.05, 781.06; 193/37
See application file for complete search history.

(56) References Cited

U.S. PATENT DOCUMENTS

| | | | |
|---|---|---|---|
| 3,650,874 A | 3/1972 | Job et al. | |
| 4,312,444 A * | 1/1982 | Mushovic | B29D 99/0035 193/37 |
| 4,573,563 A * | 3/1986 | Delhaes | F16C 13/00 193/37 |
| 5,316,129 A | 5/1994 | Daily | |
| 5,475,418 A * | 12/1995 | Patel | B41J 2/475 347/256 |
| 5,564,196 A * | 10/1996 | Nomura | F26B 13/14 162/273 |
| 5,906,268 A | 5/1999 | Kalm | |
| 6,098,776 A * | 8/2000 | Schiering | B65G 39/02 193/37 |
| 6,131,717 A * | 10/2000 | Owen | B65G 13/075 188/82.1 |
| 6,148,986 A * | 11/2000 | Brink | B65G 39/09 193/37 |
| 6,672,983 B2 * | 1/2004 | Mohr | F16G 1/28 474/152 |
| 6,935,486 B2 * | 8/2005 | Davis | B65G 13/071 193/35 R |

(Continued)

FOREIGN PATENT DOCUMENTS

| | | |
|---|---|---|
| BE | 490944 | 3/1950 |
| DE | 23 58 809 | 6/1975 |
| DE | 299 05 093 U1 | 11/1999 |

OTHER PUBLICATIONS

"Schott, Guide to Glass", second addition, p. 25 (1 page).
(Continued)

*Primary Examiner* — Douglas A Hess
(74) *Attorney, Agent, or Firm* — Taylor IP, P.C.

(57) ABSTRACT

A roller including a roller body in a cylindrical form. The roller body comprises at least partially of a borosilicate glass material.

12 Claims, 1 Drawing Sheet

(56) References Cited

U.S. PATENT DOCUMENTS

| | | | | |
|---|---|---|---|---|
| 7,290,649 | B2* | 11/2007 | Wolkerstorfer | B65G 13/073 198/781.01 |
| 7,870,949 | B2* | 1/2011 | Kanaris | B65G 39/02 193/35 R |
| 8,919,539 | B2* | 12/2014 | Schmidt | H02J 50/10 198/788 |
| 2002/0008007 | A1 | 1/2002 | Thomas et al. | |
| 2004/0173440 | A1 | 9/2004 | Mauch et al. | |

OTHER PUBLICATIONS

DURAN®-glass of DURAN group GmbH date sheet taken from http://www.duran-group.com/de/ueber-duran/duran-eigenschaften.html (2 pages).

"FIOLAX® clear and FIOLAX® amber" according to the data sheet FIOLAX® of Schott AG taken from http://www.schott.com/d/tubing (6 pages).

* cited by examiner

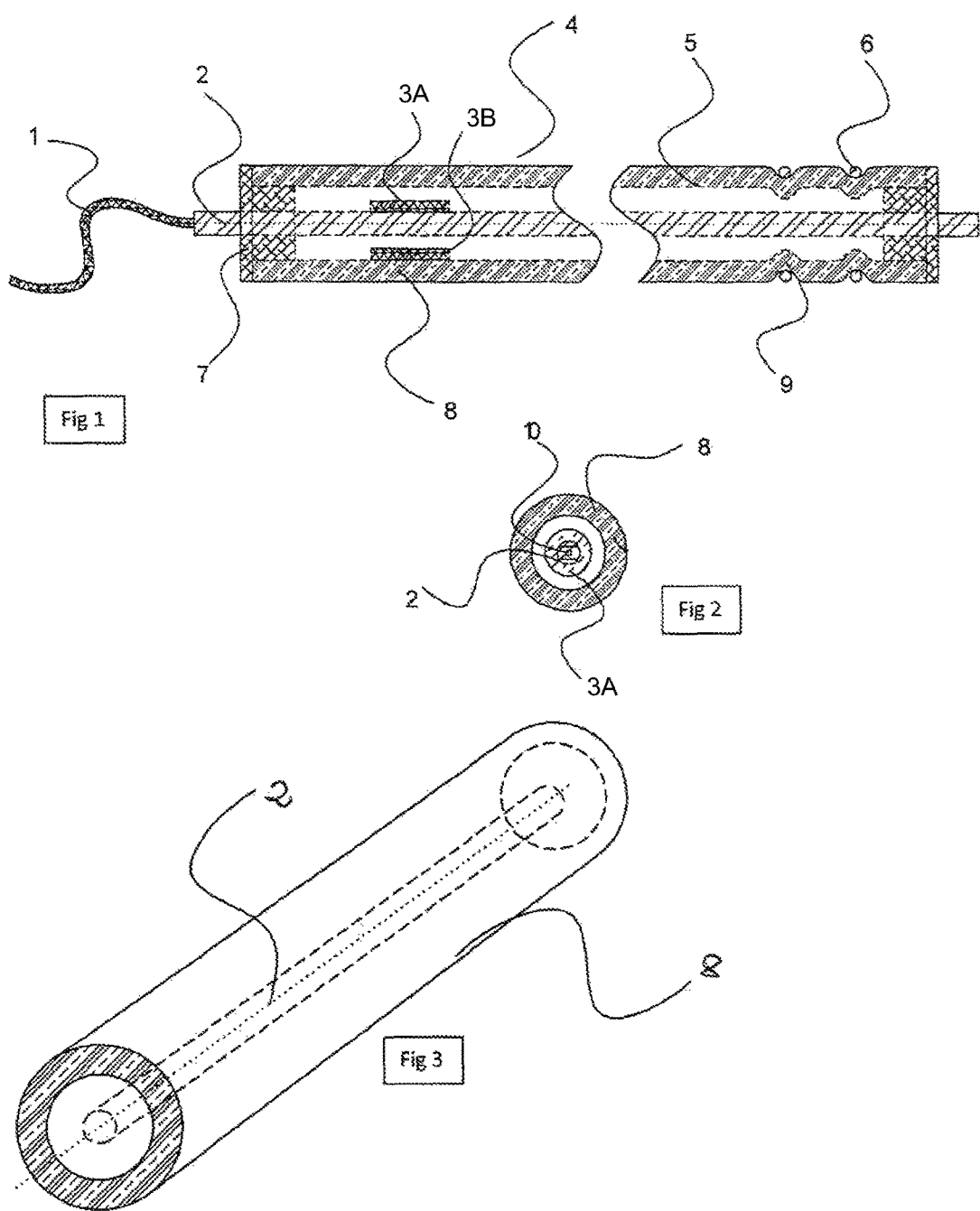

ROLLER

BACKGROUND OF THE INVENTION

1. Field of the Invention

The invention relates to a roller, especially a roller for roller conveyors and/or logistic systems including a roller body, especially in a cylindrical form.

2. Description of the Related Art

Rollers are used in the state of the art within roller conveyor lines to transport goods in many industries including but not limited to electronic, automotive, food processing, pharmaceutical, printing, packaging industry as well as logistics. Currently rollers use polymer or metal structures of various iterations and finishes to match their use. The main materials used for rollers are high molecular weight polyethylene, polypropylene, acetal, nylon, mild steel, aluminum and stainless steel. Urethane coatings of various densities are used to protect and improve the surface performance of the rollers made from the above mentioned materials. Rollers can be gravity powered/passive or powered. A special roller conveyor is a zero pressure accumulation system using powered rollers placed in equal distances apart from each other in zones to queue products without contact. In such a conveyor system sensors could be used to detect e. g., the products to be conveyed. Such sensors could be external sensors mounted along or between rollers with a centralized control system to allow interaction between sensors and rollers.

US 2002/0008007 A1 shows a roller conveyor with a plurality of rollers which are held in a frame. The rollers are assigned to several sections. A drivable and breakable roller is assigned to each section which is coupled with the other rollers of the same section. In order to enable a simple arrangement, in US 2002/0008007A1 the drivable and breakable rollers are each held on a fixed axle on which a drive roller is also held and which can be coupled with the drivable and breakable roller by way of an electromechanical clutch, which roller on its part is provided with an electromechanical braking device. The material of the roller in US 2002/0008007 A1 is not further specified, the rollers are only described to be drivable and breakable. Furthermore the rollers in US 2002/0008007A1 show annular grooves incorporated in to the outer surface of the roller for driving purposes.

U.S. Pat. No. 5,906,268 describes a sensor roller and method for detecting the presence of a tray located thereon, where the tray is traveling along a conveyor system, including a housing having an interior chamber and a plurality of apertures. The apertures are in one-to-one correspondence with actuators, where the actuators each have an exposed portion protruding through the apertures. The sensor roller further includes a piston slidable in the interior chamber of the housing and engaging the actuators. The piston slides between a non-actuated position to an actuated position in response to a tray travelling along the conveyor system depressing an actuator into the interior chamber of the housing. A sensor detects the presence of the piston in the actuated position and generates a detection signal in response thereto. The sensor roller according U.S. Pat. No. 5,906,268 has a cylindrical housing that is preferably fabricated from a galvanized steel tube. According to U.S. Pat. No. 5,906,268 other materials are possible, but no specific further material apart from steel is mentioned.

U.S. Pat. No. 5,316,129 shows a conveyor roll for conveying heated glass sheets along a conveyor assembly. The conveyer role comprises fused silica roller having opposing cylindrical ends, a pair of end caps formed from a machinable steel which may be heat resistant for rotatably mounting the ceramic roller within a conveyor assembly, wherein each end cap has a tubular wall for receiving and surrounding one of the cylindrical ends of the roller, and a spring retainer for non-rotatably mounting each of the end caps to the roller. Each spring retainer includes a coil spring formed from flat sided coils helically wound around a cylindrical end of the roller, each of which coils includes bent portions and straight portions for resiliently and frictionally inter-engaging the tubular wall of the cap and the cylindrical end of the roller, respectively, despite the thermal differential expansion that occurs between the tubular wall of the cap and the cylindrical end of the roller as the roll is exposed to elevated temperatures. Each end cap includes a screw thread around its open end that threadedly engages the coils of the retainer spring and axially secures the end cap to its respective cylindrical roller end.

U.S. Pat. No. 3,650,874 shows a roller with a rubber material. The rubber is bond to a polyolefine.

From US 2004/0173440 a roller is known, especially for roller conveyors of transport and/or logistic systems, including an integrated sensor system. The roller can be a passive roller and/or a driven roller. The roller can also be provided with an integrated drive system and/or integrated information processing units. A positive fit between the roller and a support structure is provided by at least one polygonal profiled section on the end of the roller. Contacts to the lines for the power supply and the data bus are advantageously produced with penetration clips. The material of the roller according to US 2004/0173440 is a plastic. Capacitive sensors are aligned in such a way that the rollers made of plastic are blanked out.

DE 29905093U1 shows a roller made from a glass material. The roller according to DE 29905093 U1 is not a tube but a glass made out of a flat glass, a pressed glass or a cast glass. A glass tube has not made known nor is it obvious from DE 29905093U1. Moreover no glass material which can be used for a roller is specified in DE 29905093U1.

BE 490944 also shows a roller made from a glass material. In BE 490944 as well as in DE 2990509341 the usage of a specific glass material is not disclosed.

DE 2358809 discloses a roller for a conveyor belt with a wearing course made of a glass or a ceramic material. Between the roller and the wearing course an adhesive layer and/or a buffer layer is introduced. A specific glass material for the wearing course is not disclosed.

The problems of the rollers according to the state of the art were their short lifetime as well as problems with sensing systems, especially when the rolls are used in roller conveyors.

What is needed in the art is roller that can overcome some of the disadvantages of the state of the art.

SUMMARY OF THE INVENTION

In accordance with an embodiment of the present invention, there is provided a roller body of a roller comprising at least partially a glass material, especially a borosilicate glass.

In accordance with an embodiment of the present invention, a roller, especially for roller conveyers, comprises a roller body, especially in a cylindrical form, wherein the roller body comprises at least partially of a glass material, especially a borosilicate glass material.

In accordance with an embodiment of the present invention, the roller body is a glass tube, especially a borosilicate glass tube.

In accordance with an embodiment of the present invention, the glass tube has a first open end and a second open end and the first and/or second open end comprises a bearing and/or a bushing.

In accordance with an embodiment of the present invention, the roller comprises an axle fed through the bearing and/or bushing into the glass tube.

In accordance with an embodiment of the present invention, the glass tube has an outer surface and an inner surface wherein the inner surface of the glass tube comprises a protective coating, especially a UV-protective coating.

In accordance with an embodiment of the present invention, the glass tube has an outer surface and an inner surface wherein the outer surface is a shaped surface, especially a shaped surface with grooves.

In accordance with an embodiment of the present invention, the roller comprises one or more sensor elements, especially optical sensor elements.

In accordance with an embodiment of the present invention, the sensor elements are mounted within the glass tube along the interior surface and/or on the axle fed through the glass tube.

In accordance with an embodiment of the present invention, the roller comprises a drive element, especially an electric motor situated within the glass tube.

In accordance with an embodiment of the present invention, the material of the bearing and/or bushing and of the glass tube has essentially the same coefficient of expansion $\alpha_{20°-300°\ C.}$ in the region $3_{+}10^{-6}$ 1/K to $10_{+}10^{-6}$ 1/K.

In accordance with an embodiment of the present invention, the glass tube has an outer surface and an inner surface and the glass tube comprises on the outer a surface further coating.

In accordance with an embodiment of the present invention, the glass tube has a wall-thickness, especially a wall-thickness in the range of 1.5 mm to 20 mm, preferably 1.8 mm to 10 mm.

In accordance with an embodiment of the present invention, a roller conveyor, especially for the transportation of goods, especially electronic, automotive, food processing, pharmaceutical, printing, packaging industry comprises one or more passive and/or driven rollers, wherein each of the rollers comprise a roller body, especially in a cylindric form, wherein the roller body comprises at least partially of a glass material, especially a borosilicate glass material.

In accordance with an embodiment of the present invention, use of a roller in a roller conveyor or logistic system especially for electronic, automotive, food processing, pharmaceutical, printing, packaging products is provided, wherein the roller comprises a roller body, especially in a cylindrical form, wherein the roller body comprises at least partially of a glass material, especially a borosilicate glass material.

The use of a glass material for the roller body, especially a borosilicate glass has the advantage that due to the hardness of the glass material a longer lifetime for the rollers could be achieved, especially in case of conveying more abrasive or hard products. Furthermore the roller bodies made of glass provide for the possibility of a integral sensing, by or arranging sensing elements for example in the glass body. Furthermore rollers out of a glass material have a high temperature as well as corrosion resistance and provide for a hermetic sealing for sensors and components arranged in the glass body. By using a glass material a increased life time could be reached with a high resistance to fatigue.

Especially the usage of borosilicate glass for the rollers have the advantage of low corrosion and improved resistance. Borosilicate glass tubes provide a high surface smoothness. Therefore these rollers are ideal for conveying items. Moreover the cleaning of borosilicate glass tubes is improved.

In a preferred embodiment the glass body is a glass tube of cylindrical shape, especially a borosilicate glass tube, preferably a glass tube according to ISO 3585. The glass tube in cylindrical shape comprises two open ends, a first open end and a second open end. The first and second open end of the glass tube could be closed by a bearing and/or a bushing.

Through the bearing and/or the bushing an axle could be fed into the glass tube structure. This enables a free movement of the glass tube at both ends, the first open end and the second open end.

In order to protect the borosilicate glass tubes from failure due to excessive load or impact forces the borosilicate glass tube in a further embodiment can comprise a coating, especially a UV-protective coating on an inner wall of the glass tube.

For driving purposes polymer drives such as cyclotan belts can be used. In a further embodiment the glass tube has a outer surface and a inner surface. The outer surface of the glass tube can be shaped to form grooves.

In an even further improved embodiment sensors which are currently mounted externally of the roller can be mounted internally. For an example this is possible on the inner surface of the glass tube and/or on the axle fed through the glass tube. Internally mounted sensors within the glass tube give rise for a cleaner and more integrated overall system.

The rollers according to an embodiment of the invention can be driven rollers comprising bearings and/or motors or non driven rollers. In case of driven rollers an electric motor can be situated e.g. in the tube. In order to provide for a hermetic sealing of the bearing and/or bushing with the glass tube and prevent water or dust ingress from industrial cleaning processes into the tube, in a preferred embodiment the materials for the bearing and/or bushing as well as the glass tube have essentially the same coefficient of thermal expansion $\alpha 20°-300°$ C. The coefficient of thermal expansion $\alpha_{20°-300°}$ lies in the range $3_{+}10^{-6}$ 1/K-$10_{+}10^{-6}$ 1/K. Preferably, if borosilicate glass is used, the coefficient of thermal expansion $\alpha_{20°-300°}$ is between $3.0_{+}10^{-6}$ 1/K and $4_{+}10^{-6}$ 1/K, especially in the region of $3.3_{+}10^{-6}$ 1/K.

In order to improve the performance of the roller with regard to lifetime, cleaning, aesthetics or to match the sensor optics the roller can have on its outer surface a further surface coating. Such coatings could be anti-scratch and/or anti-reflective coatings. The wall-thickness of the glass tube in a preferred embodiment is at least 1.5 mm and at maximum 20 mm, preferably in the range between 1.8 mm and 10 mm.

The rollers according to an embodiment of the invention can be used in roller conveyors and logistic systems. The roller conveyors can be used in a variety of industries included but not limited to electronic, automotive, food processing, pharmaceutical, printing, packaging industry and logistics.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein:

FIG. 1 illustrates a schematic view of a roller made from a borosilicate glass tube with integrated bearings or bushings to enable free movement of the roller and the possibility of an integrated sensor element, according to an embodiment of the invention;

FIG. 2 illustrates a cross sectional end view of the borosilicate glass tube around a central axle with integrated sensors, according to an embodiment of the invention; and FIG. 3 illustrates an isometric layout of the borosilicate glass tube with the sensor position along the central axle, according to an embodiment of the invention.

Corresponding reference characters indicate corresponding parts throughout the several views. The exemplification(s) set out herein illustrate(s) (one) embodiment(s) of the invention (, in one form,) and such exemplification(s) (is) (are) not to be construed as limiting the scope of the invention in any manner.

DETAILED DESCRIPTION OF THE INVENTION

FIG. 1 depicts a cross sectional view of a roller according to an embodiment of the invention. The roller according to the invention is denoted with reference number 4. The roller according to the invention comprises a glass body of a glass material, especially a borosilicate glass material. The glass body in the depicted embodiment is a glass tube 8 of cylindrical shape. The glass tube 8 has two free ends, a first end, a second end, onto which a bearing and/or bushing could be mounted. The bearing and/or bushing closes the open ends of the glass tube 8. Through the bearings and/or bushings 7 an axle 2 is guided into the center of the glass tube 8. Such an arrangement provides for a free movement at both ends of the glass tube of the axle 2 through the center of the glass tube 8. The glass tube 8 has a inner surface 5 as well as an outer surface. In order to adapt the failure mode of the borosilicate glass tube 8 under excessive load or impact forces the inner surface 5 of the glass tube can be coated with a UV-protective coating.

For drive purposes using polymer drive belts such as cyclothan belts 6 the glass can be shaped on the outer surface. In the embodiment shown grooves 9 are formed in the outer surface. By the polymer drive belts of non-driven or driven rollers could be linked together. The glass tube allows for the integration of sensors within the tube. The sensors can be for example optical sensors. Such optical sensors 3A, 3B can be mounted internally of the glass tube along the interior surface, such as sensor 3B or on the axle itself, such as sensor 3A. Sensor 3A mounted on to the axle can be provided with data or energy via a data energy line 1 passing into the roller through the axle 2. As an alternative to the sensors or in addition thereto an internally driven motor in place of sensors 3A, 3B allow for a visual inspection of the motor and the bearings through the borosilicate glass tube 8. In order to prevent water or dust to ingress from industrial cleaning processes the bearing and/or bushing 7 can be made from materials having essential the same thermal expansion coefficient as the glass tube. In case the bearing and/or bushing 7 has essential the same thermal expansion coefficient as the glass tube the glass tube is sealed against damages. The sealing can be accomplished by using silicons, two component adhesives or UV glueing.

In order to give the roller an improved performance with respect to lifetime, cleaning, aesthetics or to match the sensor optics 3A, 3B the borosilicate glass tube 8 can have an external surface coating 4 on the outer surface of the glass tube 8. The external surface coating 4 could be anti-scratch and/or anti reflective coatings. The application of coatings will lead to improvements towards visibility in combination with the use of sensors. The borosilicate glass tube comprises a borosilicate glass as described for example in the publication "SCHOTT, Guide to glass, second edition page 25." Such a borosilicate glass comprise a high percentage of $SiO_2$ (70-80 weight-%) and furthermore 7-13 weight-% boric oxide ($B_2O_3$), 4-8 weight-% $Na_2O$ and $K_2O$ and 2-7 weight-% aluminum oxide ($Al_2O_3$). Glasses with such a composition show a high resistance to corrosion and temperature change. For this reason they are used in process plants for example in chemical industries. In particular in dangerous environments such as in case of exposition to chemicals, heat, etc. the use of borosilicate glass 3.3, which is also known as DURAN®-glass of DURAN group GmbH is advantageous. According to the data sheet of DURAN group GmbH, Hattenbergstraße 10, 55120 Mainz, brosilicate glass 3.3 has the following composition: 81 weight-% $SiO_2$, 13 weight-% $B_2O_3$, 4 weight-% $Na_2O$ and $K_2O$, 2 weight-% $Al_2O_3$. All physical data of DURAN®-glass are published on http://www.duran-group.com/de/ueber-duran/duran-eigenschaften.html.

An alternative borosilicate glasses is a borosilicate glasses of the FIOLAX®-type. FIOLAX® is a brand of Schott AG, Hattenbergstraße 10, 55120 Mainz. The composition of FIOLAX® clear according to the data sheet FIOLAX® of Schott AG, published on http://www.schott.com/d/tubing, is 75 weight-% $SiO_2$, 10.5 weight-% $B_2O_3$, 5 weight-% $Al_2O_3$. 7 weight-% $Na_2O$, 1.5 weight-% CaO. A different type of a FIOLAX® is FIOLAX® amber. The content of all the aforementioned publications are hereby incorporated by reference in their entirety into the present application.

FIG. 2 shows a cross sectional view of one end of a roller comprising a borosilicate glass tube 8, according to an embodiment of the invention. The borosilicate glass tube 8 is arranged around a central axle 2. Sensors can be arranged around the central axle 2. The axle 2 has a shaped end 10, which can be mounted into a conveyor system for easy fitting and removal. The borosilicate glass tube 8 has preferably a wall thickness of 1.8 to 10 mm.

Reference number 3A in FIG. 2 describes a sensor arranged around the axle of the glass tube.

FIG. 3 shows a three-dimensional view of a glass tube 8 with a central axle 2, according to an embodiment of the invention. The glass tube 8 is shown with open ends and has the form of a cylinder. The wall thickness of the glass tube is between 1.8 mm to 10 mm. Along the length of the axis of the roller sensors are arranged. The arrangement of sensors along the complete axle 2 of the roller allows that conveyed items across the internal length of the roller could be detected.

The inventive rollers manufactured from a glass tube have unique improvements over rollers shown in the state of the art being from a metal material or a polymer tube. The using of a glass tube instead of a metal or polymer tube allows for internally mounted sensors. The glass tube furthermore gives the possibility of visual inspection of an internal area such as bearings or motors for maintenance.

Furthermore the borosilicate glass tube has advantages such as low corrosion and a improved resistance. Furthermore due to a high surface smoothness by borosilicate glass tubes as rollers conveying of certain items and cleaning of the surface is improved. Using glass tubes has a lot of further advantages over rollers according to the state of the art. The hardness of the glass material provides for a longer lifetime in case abrasive or hard products are conveyed. Furthermore the cleaning is improved since glass materials have a high chemical resistance and an impermeability to liquids and gases. Glass tubes are antibacterial and therefore safe for food. The glass tubes can be provided with self-cleaning coatings in order to provide for easy cleaning. The coatings of the glass tube can be applied onto the outer surface as well as onto the inner surface. By the coatings surface characteristics for different applications can be applied. It is possible to coat the glass tubes with conductive coatings and/or protective coatings in order to improve strengths and avoid scratches. Also functional coatings are possible. The transparence of the glass tubes allow for an internal inspection of sensors and driving systems. The sensors are protected due to the fact that glass tubes are impermeable to liquids and gases. The transmission of the glass tube is adjustable. Furthermore the glass tube can be sealed to metals, such as bushings and/or bearings. The glass tubes have a very low thermal conductivity and a high thermal shock resistance as well as a low thermal expansion coefficient. Furthermore borosilicate glass tubes are corrosion resistant even in a cold water environment. By using glass tubes the lifetime of the roller can be significantly increased. Under the environmental aspect a further advantage of the glass tube is that they are recyclable and resistant to radioactive radiation.

The glass tubes can be providing in width up to 1500 mm with an outside diameter>50 mm and a wall thickness from 1.8 mm to 9 mm. Due to the integrated grooves in the external surface the glass tube can be driven by cyclothan-polymer drive belts. Possible thermoplastic coatings prevent accumulated defects causing a reduced lifecycle during use.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A roller for roller conveyers comprising:
a roller body in a cylindrical form, the roller body comprising at least partially of a borosilicate glass material, and the roller body is a glass tube, wherein the glass tube has a first open end and a second open end and at least one of the first and second open end comprises at least one of a bearing and a bushing, wherein the material of at least one of the bearing and bushing and of the glass tube has essentially the same coefficient of expansion $\alpha_{20°-300°\ C.}$ in the region $3_+10^{-6}$ 1/K to $10_+10^{-6}$ 1/K.

2. The roller according to claim 1, wherein the roller comprises an axle fed through at least one of the bearing and the bushing into the glass tube.

3. The roller according to claim 1, wherein the glass tube has an outer surface and an inner surface, wherein the inner surface of the glass tube comprises a protective coating.

4. The roller according to claim 1, wherein the glass tube has an outer surface and an inner surface, wherein the outer surface is a shaped surface.

5. The roller according to claim 4, wherein the shaped surface has grooves.

6. The roller according to claim 1, wherein the roller comprises one or more sensor elements.

7. The roller according to claim 6, wherein the sensor elements are mounted within the glass tube along at least one of the interior surface and the axle fed through the glass tube.

8. The roller according to claim 1, wherein the roller comprises a drive element.

9. The roller according to claim 8, wherein the drive element is an electric motor situated within the glass tube.

10. The roller according to claim 1, wherein the glass tube has an outer surface and an inner surface, and the glass tube comprises a coating on the outer surface.

11. The roller according to claim 1, wherein the glass tube has a wall-thickness in the range of 1.5 mm to 20 mm.

12. A roller conveyor for the transportation of goods, comprising at least one or more of a passive and a driven roller, wherein each roller comprises:
a roller body in a cylindrical form, the roller body comprising at least partially of a borosilicate glass material, and the roller body is a glass tube, wherein the glass tube has a first open end and a second open end and at least one of the first and second open end comprises at least one of a bearing and a bushing, wherein the material of at least one of the bearing and bushing and of the glass tube has essentially the same coefficient of expansion $\alpha_{20°-300°\ C.}$ in the region $3_+10^{-6}$ 1/K to $10_+10^{-6}$ 1/K.

* * * * *